July 1, 1924.
J. MARETTE
CINEMATOGRAPHIC BAND
Filed Feb. 1, 1922
1,499,941
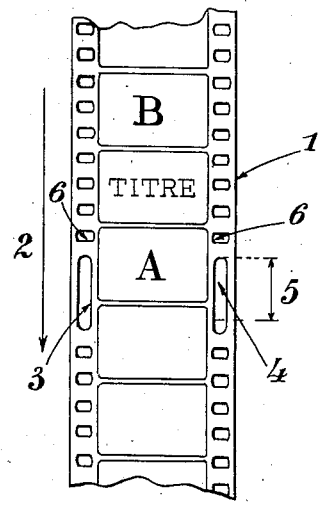
Jacques Marette
INVENTOR;
By Otto Munk
his Attorney.

Patented July 1, 1924.

1,499,941

UNITED STATES PATENT OFFICE.

JACQUES MARETTE, OF VINCENNES, FRANCE, ASSIGNOR TO PATHE CINEMA, ANCIENS ETABLISSEMENTS PATHE FRERES, OF PARIS, FRANCE.

CINEMATOGRAPHIC BAND.

Application filed February 1, 1922. Serial No. 533,412.

*To all whom it may concern:*

Be it known that I, JACQUES MARETTE, citizen of the French Republic, residing at Vincennes, Seine, in the Republic of France, have invented new and useful Improvements in Cinematographic Bands, of which the following is a specification.

It is well known that in motion picture work when it is desired to project an inanimate subject on the screen such as a title, a geometric image, a drawing of any kind or any other illustration, it is necessary to repeat for this inanimate subject a sufficient number of images of the film in order that the successive projections thereof upon the screen shall permit of their examination.

In moving picture apparatus which do not make use of feeding drums in the entraining mechanism of the film, the same result is obtained according to the invention while at the same time increasing the yield of the film in motion pictures, by suppressing the material of the film between perforations suitably chosen in number and position, in order that the entraining system without being stopped shall cease to engage at that place with the film. The latter is thereby automatically immobilized thus instantly transforming the motion picture projection into a stationary projection of the desired image (title, drawing of any kind, etc.).

To resume the motion picture projection, the band is started again by effecting thereupon a slight traction in the direction of the entraining in order to move it forward until the entraining system will again act upon the part of the film wherein the perforations have remained intact.

The accompanying drawing shows by way of example a form of construction of a motion picture band according to the invention.

It is observed in this drawing that the direction for the feed of the film 1 being that of the arrow 2, and the last image of the moving picture projection being at A, preceding the title or the inanimate subject, if two elongated perforations 3 and 4 are formed in suitable position on the margins of the band preceding the title, when the claws of the entraining system, whose stroke is for instance that indicated by the arrow 5 and less than the length of the perforations 3 and 4, shall fall into the said perforations, the film will be automatically immobilized, even though the entraining mechanism continues to operate.

To resume the motion picture projection and to cause the first motion picture image B to appear, after the title, it will suffice to exercise a slight traction upon the band in the direction of the arrow 2, in order that the claws of the entraining system shall again act upon the usual perforations 6 of the film, again causing the entraining of the latter.

It will be understood from the preceding that an important advantage of the invention is to permit of reserving for the part of the film which is to be used for motion picture projection the greatest possible length, while providing in the same conditions as for ordinary films for the projection of inanimate subjects, titles, etc., this projection being made as long as desired while at the same time making use of but a single image.

The invention is especially advantageous when there are employed bands having a limited length and particularly bands disposed in the form of endless loops.

Having now described my invention, what I claim as new and desire to secure by Letters Patent is:

A motion picture film strip adapted for use in a motion picture projection apparatus provided with feeding claws for driving the film, in which the material of the film is suppressed on both sides of the film between the feeding perforations of each of determined images intended for stationary projection so as to form elongated apertures corresponding respectively to each of said images and the length whereof is greater than that of the claws' stroke.

In testimony whereof I have signed my name to this specification.

JACQUES MARETTE.